US006949314B1

(12) United States Patent
Hossain

(10) Patent No.: US 6,949,314 B1
(45) Date of Patent: Sep. 27, 2005

(54) CARBON-CARBON COMPOSITE ANODE FOR SECONDARY NON-AQUEOUS ELECTROCHEMICAL CELLS

(75) Inventor: Sohrab Hossain, Tucson, AZ (US)

(73) Assignee: LiTech, L.L.C., Tucson, AZ (US)

( * ) Notice: Subject to any disclaimer, the term of this patent is extended or adjusted under 35 U.S.C. 154(b) by 194 days.

(21) Appl. No.: 10/223,822

(22) Filed: Aug. 19, 2002

(51) Int. Cl.[7] .......... H01M 4/48

(52) U.S. Cl. .......... 429/231.4; 429/231.8; 429/231.1; 429/217; 429/233

(58) Field of Search .......... 429/231.4, 233, 429/231.8, 231.1, 217

(56) References Cited

U.S. PATENT DOCUMENTS

| | | | | |
|---|---|---|---|---|
| 4,136,213 A | 1/1979 | Fung et al. | 429/122 |
| 5,028,500 A | 7/1991 | Fong et al. | 429/194 |
| 5,153,082 A | 10/1992 | Ogino et al. | 429/194 |
| 5,158,578 A | 10/1992 | Yoshimoto et al. | 29/623.5 |
| 5,443,928 A | 8/1995 | Takeuchi et al. | 429/231.4 |
| 5,580,538 A | 12/1996 | Bito et al. | 423/447.4 |
| 5,667,914 A | 9/1997 | Nagamine et al. | 429/194 |
| 5,679,481 A | * 10/1997 | Takanishi et al. | 429/223 |
| 5,698,340 A | 12/1997 | Xue et al. | 429/218 |
| 5,776,633 A | 7/1998 | Mrotek et al. | 429/218 |
| 5,834,138 A | 11/1998 | Yamada et al. | 429/194 |
| 6,042,969 A | 3/2000 | Yamada et al. | 429/218.1 |
| 6,228,516 B1 | 5/2001 | Denton, III et al. | 429/122 |
| 6,436,576 B1 | 8/2002 | Hossain | 429/231.8 |
| 6,489,061 B1 | 12/2002 | Hossain | 429/231.1 |

FOREIGN PATENT DOCUMENTS

| | | |
|---|---|---|
| EP | 0 803 926 A2 | 10/1997 |
| EP | 0 803 926 A3 | 7/1998 |
| WO | WO9624956 | 8/1996 |
| WO | WO98/47195 | 10/1998 |
| WO | WO 01/91208 A2 | 11/2001 |

OTHER PUBLICATIONS

Essentials of Carbon–Carbon Composites, Edited by C.R. Thomas, The Royal Society of Chemistry, Cambridge, 1993 (cover, preface and pp. 1–37).

Carbon–Carbon Composites, By G. Savage, Chapman & Hall, New York, 1993 (cover, preface and pp. 276–323.

Patent Abstracts of Japan: Title: "Manufacture of Carbon Substrate for Lithium Secondary Battery Negative Electrode, and Negative Electrode for lithium Secondary Battery". Publication No. 10021916; Publication Date: Jan. 23, 1998; Inventor: Saeki Toru.

Patent Abstracts of Japan: Title: "Negative Electrode for Lithium Secondary Battery and Lithium Secondary Battery Using Same Electrode". Publication No. 05283061; Publication Date: Oct. 29, 1993; Inventor: Mabuchi Akihiro.

Patent Abstracts of Japan: Title: "Lithium Secondary Battery". Publication No. 11250909; Publication Date: Sep. 17, 1999; Inventor: Nishio Koji.

"Carbon–Carbon Composites as anodes for Lithium–ion battery systems." Sohrab Hossain, Yousry Saleh, Raouf Loutfy. Journal of Power Sources 4136 (2001) 1–9.

* cited by examiner

*Primary Examiner*—Laura Weiner
(74) *Attorney, Agent, or Firm*—Lawrence R. Oremland PC

(57) ABSTRACT

The present invention provides a secondary electrochemical cell comprising a body of aprotic, non-aqueous electrolyte, first and second electrodes in effective electrochemical contact with the electrolyte, the first electrode comprising active materials such as a lithiated intercalation compound serving as the positive electrode or cathode and the second electrode comprising a carbon-carbon composite material infiltrated with polymeric binder and serving as the negative electrode or anode. Such an electrochemical cell has improved mechanical properties and cycle life as compared with similar secondary non-aqueous electrochemical cells having carbon-carbon composite anodes that are not incorporated with polymeric binder.

21 Claims, 2 Drawing Sheets

Cycling Behavior of Lithium-ion Cells made with carbon-carbon composite anodes with Binder and without Binder. Rate: C/3

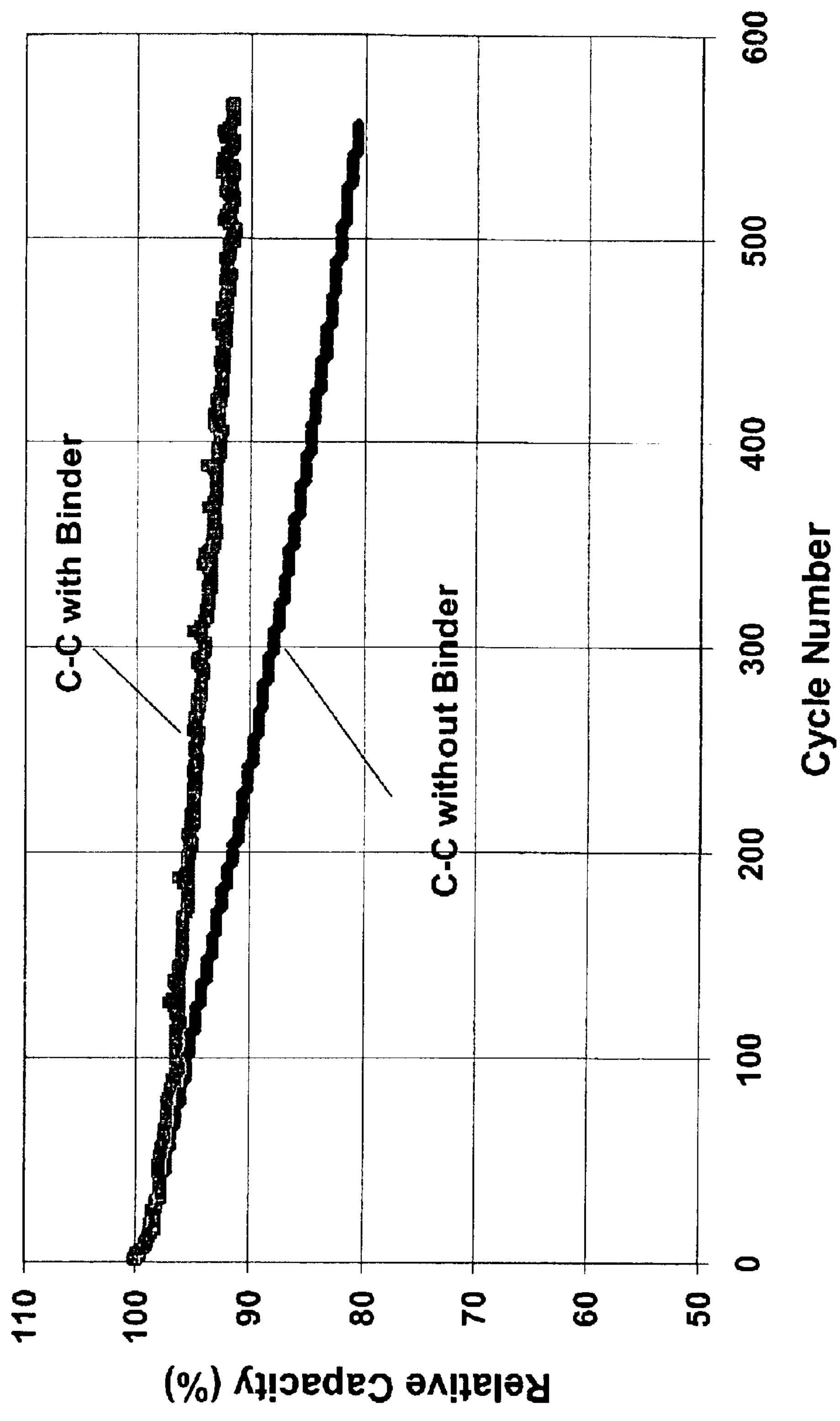
Fig.1: Cycling Behavior of Lithium-ion Cells made with carbon-carbon composite anodes with Binder and without Binder. Rate: C/3

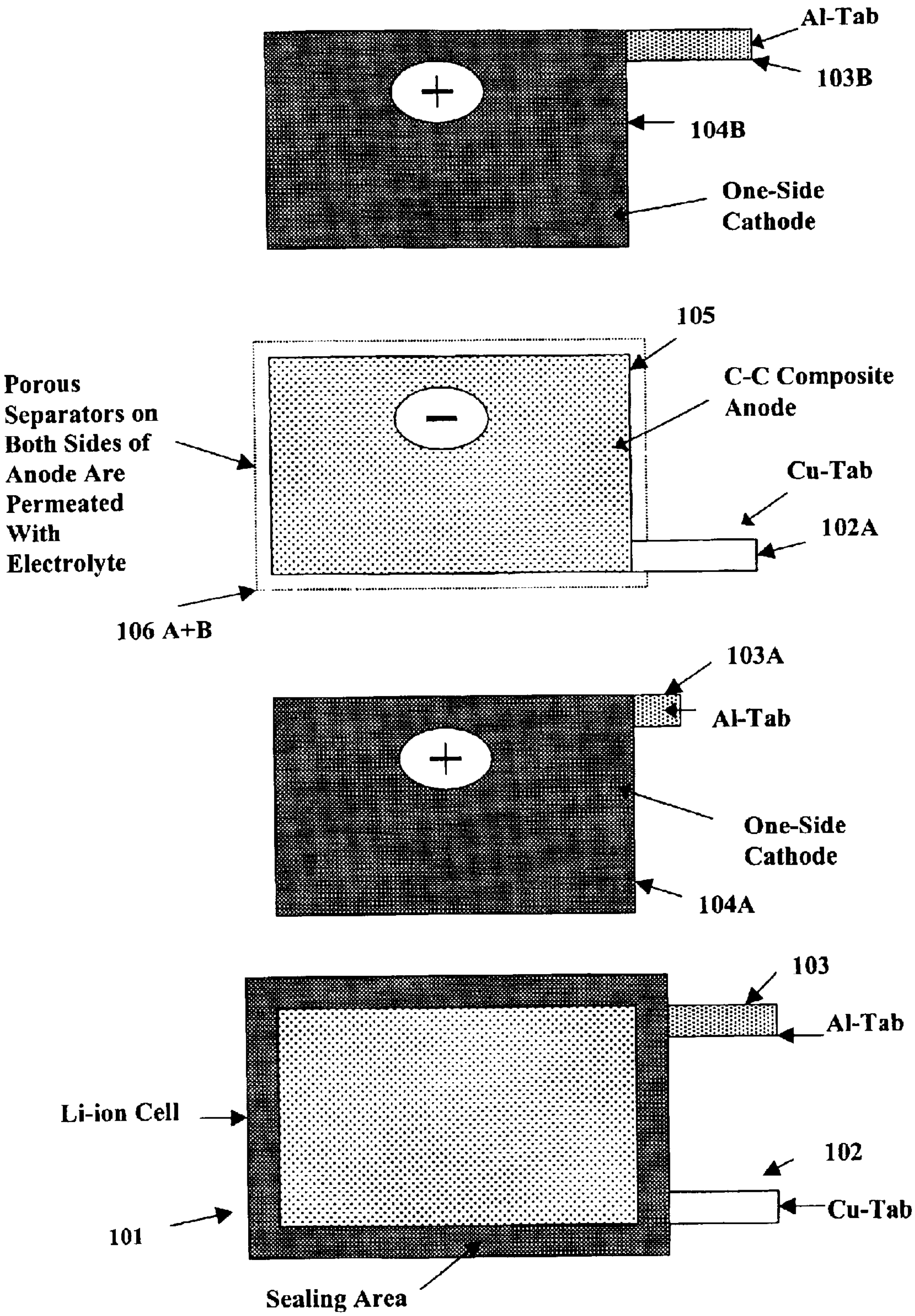
Fig. 2: Schematic Diagram of a Lithium Ion-Cell.

CARBON-CARBON COMPOSITE ANODE FOR SECONDARY NON-AQUEOUS ELECTROCHEMICAL CELLS

FIELD OF INVENTION

The present invention relates to non-aqueous secondary electrochemical cells, and to batteries made of such cells, in which carbon-carbon composite is the active material of the negative electrode (anode) of such cells and batteries.

BACKGROUND

In a prior application, Ser. No. 09/577,638, filed by the applicant on May 24, 2000, and entitled Carbon-Carbon Composite as an Anode for Secondary Non-Aqueous Electrochemical Cells, which is assigned to the assignee of this application, and incorporated herein by reference, applicant has demonstrated that the use of carbon-carbon composite as the anode of a lithium-ion electrochemical cell improves various characteristics of such a cell, in relation to a cell using carbon or graphite as the active material of an anode for the cell. A carbon-carbon composite electrode is fundamentally different from carbon or graphite electrode in several important respects (e. g., carbon-carbon composite is made from carbon fibers attached to each other with carbon matrix whereas a traditional carbon or graphite anode is typically made of carbon/graphite powder with polymeric binder. In addition, no metal substrate support is required for carbon-carbon composite electrode but metal substrate support is required for carbon/graphite electrode).

The carbon-carbon composite disclosed in application Ser. No. 09/577,638 (and which provides the disclosed advantages over an anode with carbon/graphite as an anode active material), is formed without a binder. However, as described below in connection with the present invention, the mechanical properties of a carbon-carbon (C—C) composite electrode can further be improved which will provide ease of handling during cell manufacturing process. This improvement in mechanical properties may also improve further the cycle life of lithium-ion cells made with the C—C composite anode.

OBJECTIVES AND ADVANTAGES OF PRESENT INVENTION

Accordingly, it is the primary objective of the present invention to improve the mechanical properties of C—C composite anode material and thereby the cycle life of lithium-ion electrochemical cells and battery systems using such cells.

SUMMARY OF THE INVENTION

The present invention provides new and useful structure for a carbon-carbon composite anode of a non-aqueous secondary electrochemical cell, which further improves certain characteristics of such a cell. Specifically, the present invention improves the mechanical properties of the carbon-carbon composite anode and the cycle life of a lithium-ion electrochemical cell using such an anode.

Briefly stated, this invention provides a secondary electrochemical cell comprising a body of aprotic, non-aqueous electrolyte, first and second electrodes in effective contact with said electrolyte, the first electrode comprising an active material such as lithiated intercalation compound and the second electrode comprising carbon-carbon composite containing polymeric binder material. In accordance with this invention, commercially available carbon-carbon composite material of high electronic conductivity which also provides high lithium-ion intercalation capacity is infiltrated with polymeric binder material to make the negative electrode, i. e., anode of the electrochemical cell. The mechanical strength of the polymer binder infiltrated carbon-carbon composite anode is superior to the carbon or graphite anode used in commercial lithium-ion batteries. The composite can accept repeated expansion and contraction as a result of intercalation and de-intercalation of lithium-ions during charge-discharge process with a little or no change in mechanical integrity. The impedance of the anode, therefore, remains almost the same. The cycling behavior of the lithium-ion cells made with the polymer binder infiltrated carbon-carbon composite shows significant improvement.

BRIEF DESCRIPTION OF THE DRAWINGS

In the accompanying drawings:

FIG. 1 represents a comparison of the cycling behavior of lithium-ion cells with a C—C composite anode with a polymeric binder, in accordance with the present invention, and with a C—C composite anode without a binder; and FIG. 2 is a schematic representation of a lithium-ion cell embodying a carbon-carbon composite anode in accordance with the present invention.

DESCRIPTION OF THE PREFERRED EMBODIMENTS

In a preferred form of the present invention, a lithium-ion cell is comprised of a negative electrode of carbon-carbon composite material heat treated in the range of 1000° C. to 3000° C. and infiltrated with polymeric binder material such as polyvinyledene fluoride (PVDF) or its homologues, ethylene propylene diene monomer (EPDM), styrene-butadiene rubber (SBR) or Teflon and a positive electrodes containing $LiCoO_2$, $LiNiO_2$, $LiNiTiO_2$, $LiNiCoO_2$, $LiNiCoAlO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or combinations of these materials.

The electrolyte used in a lithium-ion cell and battery of the present invention is a non-aqueous aprotic organic electrolyte and preferably a non-aqueous solution consisting of a solute, such as $LiPF_6$, $LiBF_4$, $LiAsF_6$, $LiCF_3SO_3$, $LiN(CF_3SO_2)_2$ or $LiClO_4$, dissolved in a solvent such as propylene carbonate, ethylene carbonate, diethyl carbonate, dimethyl carbonate, ethyl methyl carbonate and as well as mixtures thereof.

There are a number of known approaches suitable for producing carbon-carbon composite material, which are described e.g. in the following review Books: Essentials of Carbon-Carbon Composites, Edited by C. R. Thomas, The Royal Society of Chemistry, Cambridge, 1993 and Carbon-Carbon Composites, by G. Savage, Chapman & Hall, New York, 1993. The disclosures of such review books are incorporated herein by reference. The carbon-carbon composite is made for this invention by heat treating at the temperature range of 1000–3000° C. in inert atmosphere and can have density, specific resistance, and thermal conductivity in the range of 1.3–2.0 g/cc, 50–1,000 $\mu$ohm-cm, and 50–600 $Wm^{-1}K^{-1}$, respectively. The carbon fiber used to make the carbon-carbon composite can be pitch-, PAN-, and/or rayon-based fiber. For purpose of present invention, pitch and PAN-based fibers are preferable. Other than the foregoing general parameters, the present invention is not limited to any specific approach to produce carbon-carbon composite.

The polymeric binder is incorporated into the carbon-carbon composite material by soaking (preferably overnight) in a solution containing the binder material. The binder can be, e.g. polymeric binder material such as polyvinyledene fluoride (PVDF) or its homologues, ethylene propylene diene monomer (EPDM), styrene-butadiene rubber (SBR) or Teflon. Moreover, in light of the present disclosure other types of polymeric binder materials that can improve the mechanical strength of carbon-carbon composite are likely to be apparent to those skilled in the art.

A preferred form of lithium-ion cell embodying a carbon-carbon composite anode is shown in FIG. 2. Wherein the assembled cell 101 is shown with the anode, cathode, and electrolyte enclosed in a sealed sandwich structures with the carbon-carbon composite anode electrically accessible by means of protruding copper conductive tab 102 and the lithiated intercalation compound cathode electrically accessible by means of a protruding conductive aluminum tab 103. The anode (not shown) and cathode (not shown) of the assembled cell 101 are separated by a porous separator (not shown) that is permeated with an aprotic non-aqueous electrolyte (not shown) that is in effective contact with both the anode and cathode.

In FIG. 2, above the assembled cell 101, there is also shown the components of the cell 101, comprised of a pair of one-sided cathodes 104A and 104B and a carbon-carbon composite anode 105, suitable to be assembled as a sandwich (cell 101) with the anode 105 positioned between the respective cathodes 104A and 104B being separated from the anode 105 by respective porous separators 106A and 106B that are permeated with an aprotic, non-aqueous electrolyte that is in effective contact with both the cathode and the facing anodes.

Conductive aluminum tabs 103A and 103B are provided for the respective cathodes 104A and 104B and a copper conductive tab 102A is provided for the anode 105, whereby the respective electrodes of the cell 101 are electrically accessible when assembled as a sandwich and enclosed within a sealed enclosure.

The materials of the respective anodes and cathodes of the cell 101 may be formed of materials, as described herein in further detail.

For example, as described above, the anode comprises carbon-carbon composite impregnated with polymeric binder. The cathode may be formed of $LiCoO_2$, $LiNiCoO_2$, $LiNiO_2$, $LiNiTiO_2$, $LiNiCoAlO_2$, $LiNiTiAlO_2$, $LiNiMnAlO_2$, $LiNiMnO_2$, $LiNiCoMnO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or a combination thereof, supported by an aluminum foil substrate. The respective anode and cathode electrodes are maintained spaced from one another by a respective electrically non-conductive separator that is permeable, whereby the aprotic, non-aqueous electrolyte is carried by the spacers and maintained in effective electrochemical contact with both the cathode and facing anode.

The permeable separator may be formed of a micro-porous poly-olefin film.

It is to be understood that a plurality of electrochemical cells as described above can be used to assemble a battery of such cells by connecting the respective electrodes of the assembly of cells in an electrical circuit and in a known fashion to produce a battery with the voltage or current characteristics as determined by the number of cells connected in series or parallel circuit relationship.

The following specific examples are given to illustrate the practice of the invention, but are not to be considered as limiting in any way.

EXAMPLES 1

Carbon-carbon composite was made from pitch-based carbon fiber and heat-treated to 2800° C. in an inert atmosphere. The carbon-carbon composite was made as a thin plate of thickness 150 $\mu$m. Several of these plates were soaked overnight in dimethyl formamide (DMF) containing PVDF binder. The plates were then taken out from the solution, dried first at ambient temperature, and finally under vacuum at 65° C. The loading of binder is preferably (a) not more than 1 mg/cm$^2$, (b) in the range of 0.1 mg/cm$^2$ to 1 mg/cm$^2$. In this example the loading of the binder (PVDF) was approximately 0.2 mg/cm$^2$. The mechanical properties such as flexural strength, tensile strength, and compressive strength of the binder additive C—C composite were measured and compared with the C—C composite having no binder additive. Table 1 shows a comparison of these properties. The mechanical strength of binder additive C—C composite is significantly higher than that of C—C composite without any binder additive.

TABLE 1

Effect of Binder Additive on Mechanical Properties of C—C Composite

| Properties | Measured Value without Binder Additive | Measured Value with Binder Additive |
|---|---|---|
| Flexural Strength, MPa | 45–50 | 310–330 |
| Tensile Strength, MPa | 155–160 | >675 |
| Compressive Strength, MPa | 45–50 | >55 |

EXAMPLES 2

Carbon-carbon composite made as in Example 1 and infiltrated with PVDF binder additive (0.2 mg/cm$^2$) as mentioned above was used as an anode of a lithium-ion cell to evaluate the concept of the present invention. The lithium-ion cell included a negative electrode made from the carbon-carbon composite, a lithiated cobalt dioxide positive electrode and 1M $LiPF_6$ electrolyte in a mixture (1:1 v/v) of ethylene carbonate/dimethyl carbonate (EC/DMC) solvents. A micro-porous poly-olefin (Celgard 2400) separator was used in between the positive and negative electrodes to isolate them electronically. The positive electrode was made from a mixture of 85% $LiCoO_2$, 6% carbon black and 9% PVDF in DMF by coating on to an aluminum foil.

The aprotic, non-aqueous 1M $LiPF_6$ electrolyte mixture permeated the micro-porous poly-olefin separator, whereby the electrolyte was in effective contact with both the positive and negative electrodes, which were nevertheless maintained spaced and electrically isolated from one another.

The developed cell was charged at a constant current of 0.5 mA/cm$^2$ to 4.2 V and then at a constant voltage (4.2 V) for 3 hours or until the current dropped to 0.02 mA/cm$^2$. The cell was then discharged at a constant current of 0.8 mA/cm$^2$ to a cut-off voltage of 2.50 V. The charge discharge process was repeated to evaluate the cycle life of the cell.

A lithium ion cell was made with the same components as described above except the negative electrode was made from the C—C composite without any binder additive. The above experimental steps were repeated with the cell.

FIG. 1 shows a comparison of capacity fade with cycle number for the lithium-ion cell made with a binder, in accordance with the present invention, and for the cell made without a binder. A capacity fade of only 9% for 566 cycles was observed with the cell made with a binder, in accordance to the present invention. For the cell made without binder, a capacity fade of 20% after 556 cycles was observed. Hence, a cell with an anode made of C—C composite with binder shows an improved capacity fade in comparison with a cell made of C—C composite without binder.

What is claimed is:

1. A rechargeable electrochemical cell comprising a body of aprotic, non-aqueous electrolyte, first and second electrodes in effective contact with said electrolyte, the first electrode comprising a lithiated intercalation compound, and the second electrode comprising carbon-carbon composite infiltrated with polymeric binder additive.

2. An electrochemical cell as defined in claim 1, wherein the carbon-carbon composite is made by heating in the temperature range of 1000° C. to 3000° C.

3. An electrochemical cell as defined in claim 1, wherein the carbon-carbon composite is infiltrated with polyvinylidene fluoride (PVDF) binder material.

4. An electrochemical cell as defined in claim 1, wherein the loading of the polymeric binder is not more than 1 $mg/cm^2$.

5. An electrochemical cell as defined in claim 1, wherein the loading of the polymeric binder is in the range of 0.1 $mg/cm^2$ to 1 $mg/cm^2$.

6. An electrochemical cell as defined in claim 1, wherein the carbon-carbon composite is made from pitch-based carbon fiber.

7. An electrochemical cell as defined in claim 1, wherein the carbon-carbon composite is made from PAN-based carbon fiber.

8. An electrochemical cell as defined in claim 1, wherein the carbon-carbon composite is made from rayon-based fiber.

9. An electrochemical cell as defined in claim 1, wherein the lithiated transition metal intercalation compound of the first electrode comprises a compound taken from a group comprising $LiCoO_2$, $LiNiCoO_2$, $LiNiO_2$, $LiNiTiO_2$, $LiNiCoAlO_2$, $LiNiTiAlO_2$, $LiNiMnAlO_2$, $LiNiMnO_2$, $LiNiCoMnO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, and $Li_2ZrN_2$, and combinations of the foregoing.

10. An electrochemical cell as defined in claim 1, wherein the electrolyte is a non-aqueous organic electrolyte solution comprising a lithium compound solute dissolved in a non-aqueous solvent.

11. An electrochemical cell as defined in claim 10, wherein the electrolyte comprises a solute selected from a group comprising $LiPF_6$, $LiBF_4$, $LiAsF_6$, $LiCF_3SO_3$, $LiN(CF_3SO_2)_2$, and $LiClO_4$.

12. An electrochemical cell as defined in claim 10, wherein the electrolyte comprises a non-aqueous solvent selected from a group comprising propylene carbonate, ethylene carbonate, diethyl carbonate, dimethyl carbonate and ethyl methyl carbonate, and combinations of the foregoing.

13. An electrochemical cell as defined in claim 1, wherein the first electrode is a cathode comprising a metal substrate having the lithiated intercalation compound affixed to a surface thereof, wherein the second electrode is an anode comprising a carbon-carbon composite infiltrated with polymeric binder and wherein said respective surfaces of the cathode and anode are separated from one another by a micro-porous electrically non-conductive separator that is permeated by said aprotic, non-aqueous electrolyte which is in effective contact with said respective surfaces of the anode and cathode.

14. An electrochemical cell as defined in claim 13, wherein the separator comprises a micro-porous poly-olefin film.

15. An electrochemical cell as defined in claim 13, wherein the cathode and anode form a sandwich that is contained within a sealed enclosure and wherein each of said cathode and anode has a connector extending out of the sealed enclosure for connecting said cell to an external electric circuit.

16. An electrochemical cell as defined in claim 13, wherein the cathode including its substrate, anode, and the electrolyte permeated separator are all contained within a sealed enclosure and wherein each of said cathode and anode has a connector extending out of the sealed enclosure for connecting said cell to an external electric circuit.

17. A battery comprising a plurality of electrochemical cells as defined in claim 16, having their respective electrodes connected in an electric circuit defining a battery of said cells.

18. A battery comprising a plurality of electrochemical cells as defined in claim 13, having their respective electrodes connected in an electric circuit defining a battery of said cells.

19. A battery comprising a plurality of electrochemical cells as defined in claim 1, having their respective electrodes connected in an electric circuit defining a battery of said cells.

20. An electrochemical cell as defined in claim 1, wherein the electrode is formed by providing carbon-carbon composite, and then soaking the carbon-carbon composite in binder material.

21. A rechargeable electrochemical cell comprising a body of aprotic, non-aqueous electrolyte, first and second electrodes in effective contact with said electrolyte, the first electrode comprising a lithiated intercalation compound, and the second electrode comprising carbon-carbon composite infiltrated with polymeric binder additive, wherein the carbon-carbon composite is infiltrated with ethylene propylene diene monomer (EPDM) binder material.

* * * * *